United States Patent [19]
Weitzel et al.

[11] Patent Number: 5,610,258
[45] Date of Patent: Mar. 11, 1997

[54] CROSSLINKABLE NEMATIC POLYORGANOSILOXANES

[75] Inventors: Hans-Peter Weitzel, Reischach; Susanne Weber-Koegl, München; Sotirios Chatzinerantzis, Unterschleissheim, all of Germany

[73] Assignee: Consortium für elektrochemische Industrie GmbH, Munich, Germany

[21] Appl. No.: 540,630

[22] Filed: Oct. 11, 1995

[30] Foreign Application Priority Data

Oct. 27, 1994 [DE] Germany ............... 44 38 418.1

[51] Int. Cl.⁶ ........................ C08G 77/12
[52] U.S. Cl. ................. 528/25; 528/31; 528/26; 528/30; 528/27; 252/299.01; 556/460; 556/461; 556/419; 556/425; 556/427; 556/439; 556/436; 556/445
[58] Field of Search ............... 528/31, 26, 30, 528/27, 25; 252/299.01; 556/460, 461, 419, 425, 427, 439, 436, 445

[56] References Cited

U.S. PATENT DOCUMENTS

| 4,358,391 | 11/1982 | Finkelmann et al. ............ 252/299.01 |
| 5,098,978 | 3/1992 | Riepl et al. ............ 528/15 |
| 5,138,010 | 8/1992 | Keller et al. ............ 528/26 |
| 5,211,877 | 5/1993 | Andrejewski et al. ............ 252/299.01 |

FOREIGN PATENT DOCUMENTS

| 0333022 | 9/1989 | European Pat. Off. . |
| 0569809 | 11/1993 | European Pat. Off. . |
| 0615152 | 9/1994 | European Pat. Off. . |
| 4300435 | 7/1993 | Germany . |
| 4234845 | 4/1994 | Germany . |
| 4234845A1 | 4/1994 | Germany . |

OTHER PUBLICATIONS

Derwent Abstract AN 93–361071.
Derwent Abstract AN 93–244392.
8291 Advanced Materials for Optics and Electronics, 1(1992)Dec., No.6, GB, "Liquid Crystalline Siloxanes..." by Natarajan, pp. 293–297.

Primary Examiner—Margaret W. Glass

[57] ABSTRACT

The crosslinkable nematic polyorganosiloxanes are cyclic polyorganosiloxanes containing at least three different mesogenic side groups per polyorganosiloxane, where at least two mesogenic side groups per polyorganosiloxane each contain at least three radicals selected from aromatic, heteroaromatic and cycloaliphatic radicals. They contain a methacrylic or acrylic group in at least one of the mesogenic side groups. The cyclic polyorganosiloxanes have a broad nematic phase and can be readily aligned.

5 Claims, No Drawings

CROSSLINKABLE NEMATIC POLYORGANOSILOXANES

FIELD OF INVENTION

The present invention relates to crosslinkable cyclic polyorganosiloxanes containing at least three different mesogenic side groups per polyorganosiloxane, and to their preparation and use.

BACKGROUND OF INVENTION

Low-molecular-weight nematic compounds are used in a wide variety of display elements, such as watches, pocket calculators and displays, and are distinguished by good alignability and switchability in the electric field. However, the aligned structure is not particularly stable without an applied electric field.

Applications in polarizers, retarders, etc., require compounds which have good nematic, thermally stable alignment. In addition, applications in polarizers need a nematic phase in a broad temperature range, since introduction of auxiliaries (for example dyes) can cause a narrowing of the nematic phase.

A known way of fixing liquid-crystalline properties is to bind the liquid crystals into polymeric networks, by subsequent crosslinking of aligned liquid-crystalline side-chain polymers. However, liquid-crystalline side-chain polymers are in general more difficult to align than low-molecular-weight liquid crystals owing to their higher viscosity, which generally rises with molecular weight. Examples of readily alignable liquid-crystalline side-chain polymers are cholesteric siloxanes. If the cholesterol in these materials is replaced by simple compounds which favor the formation of a nematic phase (nematogenic compounds), although nematic compounds are generally obtained, they only have a small phase width and are not readily alignable.

U.S. Pat. No. 5,211,877 describes a nematic compound which is based on cyclic polysiloxanes and mesogens containing two aromatic rings and which has only a narrow nematic phase of 69° and moderate alignability.

SUMMARY OF THE INVENTION

The object of the present invention was to provide liquid-crystalline compounds which have a broad nematic phase, can be aligned spontaneously and can be fixed in this aligned nematic state by subsequent crosslinking.

The present invention relates to cyclic polyorganosiloxanes containing at least three different mesogenic side groups per polyorganosiloxane, where at least two mesogenic side groups per polyorganosiloxane each contain at least three radicals selected from aromatic, heteroaromatic and cycloaliphatic radicals, and at least one of the mesogenic side groups contain a methacrylic or acrylic group.

Neither polyorganosiloxanes containing mesogenic side groups of different types, each containing two aromatic or cycloaliphatic radicals, nor polyorganosiloxanes containing mesogenic side groups of the same type, each containing three or more aromatic or cycloaliphatic radicals, can easily be aligned and simultaneously have a broad nematic phase.

At least two of the mesogenic side groups per polyorganosiloxane, each of which contains at least three radicals and are selected from aromatic and cycloaliphatic radicals, are preferably different.

Preferably at least 30%, in particular 50%, of the mesogenic side groups per polyorganosiloxane each contain at least three radicals selected from aromatic and cycloaliphatic radicals.

The proportion of mesogenic side groups containing methacrylic or acrylic groups is preferably at least 10%, in particular 20%.

The methacrylic or acrylic groups on the mesogenic side groups are preferably terminal.

The cyclic polyorganosiloxanes preferably contain from 3 to 20, in particular from 4 to 6, organosiloxane units.

The cyclic polyorganosiloxanes are preferably those built up from at least three units of the formula

in which

A is a mesogenic side group of the formula

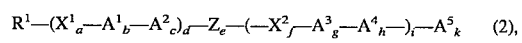

where, in the above formulae 1 and 2,

R are identical or different, optionally halogen-substituted $C_1$- to $C_{18}$-hydrocarbon radicals, o and p have the values 0, 1 or 2, $R^1$ is a radical of the formula $C_nH_m$, in which n is an integer having a value of from 2 to 20, m has the value 2 n, $X^1$ and $X^2$ are identical or different divalent radicals from the group consisting of —O—, —COO—, —CONH—, —CO—, —S—, —C≡C—, —CH=CH—, —CH=N—, —CH$_2$CH$_2$—, —N=N— and —N=N(O)—, $A^1$, $A^2$, $A^3$ and $A^4$ are identical or different divalent radicals from the group consisting of 1,4-phenylene and 1,4-cyclohexylene radicals, substituted arylenes having 1 to 10 carbon atoms, substituted cycloalkylenes having 1 to 10 carbon atoms and heteroarylenes having 1 to 10 carbon atoms, Z are identical or different divalent to tetravalent benzene, cyclohexane or cyclopentane radicals, $A^5$ are identical or different radicals from the group consisting of saturated or olefinically unsaturated alkyl, alkoxy or cycloalkyl radicals, each having 1 to 16 carbon atoms, cholestan radicals, cholesteryl radicals, halogen atoms, hydrogen atoms, hydroxyl, nitrile, acryloxy, (meth)acryloxy, (meth)acryloxyethylenoxy, (meth)acryloxydi(ethylenoxy), (meth)acryloxytri(ethylenoxy) and trialkylsiloxy groups whose alkyl radicals each have 1 to 8 carbon atoms, a, b, c, d, f, g, h and i are each identical or different integers having a value of 0, 1, 2 or 3, where the sum a+b+c+d+e+f+g+h+i is at least 2 and the sum of d and i is a maximum of 5, k is a number having a value of 1, 2, 3, 4 or 5, and e is a number having a value of 0 or 1.

Examples of unsubstituted radicals R are alkyl radicals, such as the methyl, ethyl, n-propyl, isopropyl, n-butyl, isobutyl, tert-butyl, n-pentyl, isopentyl, neopentyl and tert-pentyl radicals, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl and allyl radicals; cycloalkyl radicals, such as cyclopentyl, cyclohexyl and cycloheptyl radicals, and methylcyclohexyl radicals; aryl radicals, such as the phenyl, naphthyl, anthryl and phenanthryl radicals; alkaryl radicals, such as o-, m- and p-tolyl, xylyl and ethylphenyl radicals; and aralkyl radicals, such as the benzyl radical and the $\alpha$- and $\beta$-phenylethyl radicals.

Examples of halogen-substituted radicals R are haloalkyl radicals, such as the 3,3,3-trifluoro-n-propyl radical, the 2,2,2,2',2',2'-hexafluoroisopropyl radical, and the heptafluoroisopropyl radical, and haloaryl radicals, such as the o-, m- and p-chlorophenyl radicals.

Each R is preferably a hydrocarbon radical having 1 to 18, in particular 1 to 10, carbon atoms. More preferred radicals R are $C_1$- to $C_4$-alkyl radicals and phenyl radicals, in particular methyl radicals.

The radicals $X^1$ and $X^2$ can, if they do not have a symmetrical structure, be bonded at each end to each of their bonding partners. For example, in formula 2 above, and in the formulae below, the radical —COO— can also be bonded as —OOC—, the radical —CONH— can be bonded as —NHCO— and the radical —CH=N— can also be bonded as —N=CH—.

Preferred substituents for the substituted arylenes and cycloalkylenes $A^1$, $A^2$, $A^3$ and $A^4$ are halogen atoms, $C_1$- to $C_4$-alkoxy radicals, nitro and cyano groups, $C_1$- to $C_6$-alkyl radicals, carboxy ($C_1$- to $C_4$-alkyl) radicals and tri($C_1$- to $C_4$-alkyl)siloxy radicals.

In $R^1$, n preferably has a value of from 3 to 6 and m has the value 2 n.

Examples of radicals $A^5$ are alkyl radicals, such as the methyl, ethyl, n-propyl, isopropyl, n-butyl, isobutyl, tert-butyl, n-pentyl, isopentyl, neopentyl and tert-pentyl radicals, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and hexadecyl radicals, such as the n-hexadecyl radical; alkenyl radicals, such as the vinyl and allyl radicals; butenyl, pentenyl, hexenyl, heptenyl, octenyl, octadienyl, decenyl, dodecenyl and hexadecenyl radicals; cycloalkyl radicals, such as cyclopentyl, cyclohexyl and cycloheptyl radicals, and methylcyclohexyl radicals; alkoxy radicals, such as the methoxy, ethoxy, n-propoxy, isopropoxy, n-, sec- and tert-butoxy, pentoxy, hexoxy, octoxy, decoxy and hexadecoxy radicals; alkenoxy radicals, such as the allyloxy, butenyloxy, pentenyloxy, hexenyloxy, octenyloxy, decenyloxy and hexadecenyloxy radicals; cycloalkyl radicals, such as the cyclopentyl, cyclohexyl and cycloheptyl radicals; cycloalkenyl radicals, such as cyclopentenyl, cyclohexenyl and cycloheptenyl radicals, cholestane radicals; the cholesteryl radical; fluorine, chlorine or bromine atoms; hydrogen atoms; hydroxyl, nitrile, trimethylsilyl and triethylsilyl groups.

o preferably has the value 0 or 1. p preferably has the value 1 or 2. o and p in at least 50% of the units of formula (1) preferably have the value 1.

It is more preferred that —$R^1$—$(X^1_a$—$A^1_b$—$A^2_c)_d$— in above formula (2) is a radical of the formula

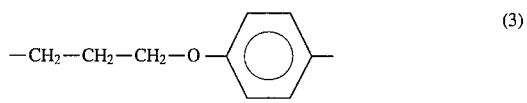

Preferred mesogenic side groups containing three aromatic radicals of formula (2) are those of the formula

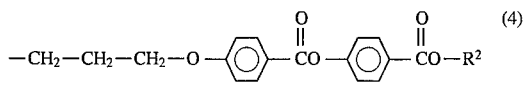

in which $R^2$ is a 4-alkylphenyl, 4-alkoxyphenyl or 2-naphthylphenyl radical.

Preferred mesogenic side groups containing a methacrylic or acrylic group are those of the formula

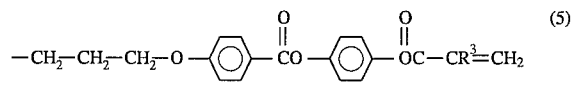

in which $R^3$ is a hydrogen atom or a methyl radical.

The novel cyclic polyorgaosiloxanes can be prepped by reacting alkenes or alkynes containing at least three different mesogenic radicals, where at least two of the alkenes or alkynes each contain at least three radicals selected from aromatic, heteroaromatic and cycloaliphatic radicals, and at least one of the alkenes or alkynes additionally contains a methacrylic or acrylic group, with cyclic polyorganosiloxanes containing at least three hydrogen atoms bonded directly to silicon.

In a preferred process for the preparation of cyclic polyorganosiloxanes of formula (1), cyclic polyorganosiloxanes built up from at least three units of the formula $$[H_oR_pSiO_{2/2}] \qquad (6),$$

are reacted with alkenes or alkynes containing mesogenic radicals of the formula

where, in formulae (6) and (7), $R^4$ is a radical of the formula $C_nH_m$, in which m has the value 2 n–1 or 2 n–3 and o, p, $X^1$, $X^2$, $A^1$, $A^2$, $A^3$, $A^4$, $A^5$, a, b, c, d, e, f, g, h, i, k, Z and R are as defined for fomulae (1) and (2).

The reaction of cyclic polyorganosiloxanes containing hydrogen atoms bonded directly to silicon with alkenes or alkynes containing mesogenic radicals is carried out by hydrosilylation in solvents, such as hydrocarbons, ethers or esters, using metals or compounds from the platinum group as catalyst. Suitable hydrosilylation processes are described, for example, in U.S. Pat. No. 5,211,877.

The above-described reactions give a mixture of different molecules.

The novel cyclic polyorgaosiloxanes can be employed for all purposes for which liquid-crystalline compounds, in particular crosslinkable liquid-crystalline compounds, are employed. They are particularly suitable for use in polarizers and retarders.

For the above applications, both mixtures of the novel cyclic polyorganosiloxanes with one another and mixtures of the novel cyclic polyorganosiloxanes with other liquid-crystalline materials or pure cyclic polyorganosiloxanes can be used. In particular, mixtures with other liquid-crystalline substances can also be used.

The novel cyclic polyorganosiloxanes containing methacryloxy and/or acryloxy groups in the mesogenic radicals of formula (2) can be three-dimensionally crosslinked. This crosslinking is preferably effected by means of free radicals generated by peroxides, UV light or electromagnetic radiation with higher energy than UV light, or thermally. However, the crosslinking can also be effected by crosslinking agents containing hydrogen atoms bonded directly to silicon atoms with catalysis by the above mentioned platinum metal catalysts. It can also take place cationically or anionically. Crosslinking by UV light is more preferred. This crosslinking is described in U.S. Pat. No. 5,211,877.

In the examples below, unless otherwise stated, (a) all amounts are by weight;

(b) all pressures are 0.10 MPa (abs.);

(c) all temperatures are 20° C.;

(d) Tg=glass transition temperature;

(e) Tc=clearing point.

Examples

Example 1

Preparation of the alkenes of formula (7)
(a) Esters of p-hydroxybenzoic acid 1 mole of p-hydroxybenzoic acid and 5 mole of the target phenol are dissolved in 800 ml of xylene, 20 g of p-toluenesulfonic acid are added, and the mixture is heated on a water separator until the theoretical amount of water has separated off. The reaction solution is cooled to room temperature, and 200 ml of petroleum ether (40°–60° C.) are added. The precipitated product is filtered off with suction and washed with petroleum ether until free from phenol.
Yields:

| | |
|---|---|
| Phenyl 4-hydroxybenzoate | 85% |
| 4-Methoxyphenyl 4-hydroxybenzoate | 74% |
| 4-Ethylphenyl 4-hydroxybenzoate | 80% |
| 4-Propoxyphenyl 4-hydroxybenzoate | 52% |
| 2-Naphthyl 4-hydroxybenzoate | 50% |

(b) Ester between 4-allyloxybenzoic acid and 4-hydroxybenzoic esters 1 mole of p-hydroxybenzoic ester and 1 mole of 4-allyloxybenzoyl chloride, prepared as described in U.S. Pat. No. 4,358,391, are dissolved in 500 ml of toluene and refluxed for 8 hours. The reaction solution is cooled to room temperature, and the precipitated product is filtered off with suction. The crude product is recrystallized from ethanol. Yields:

Ester between 4-allyloxybenzoic acid and phenyl 4-hydroxybenzoate 85%

Ester between 4-allyloxybenzoic acid and 4'-methoxyphenyl 4-hydroxybenzoate 64%

Ester between 4-allyloxybenzoic acid and 4'-ethylphenyl 4-hydroxybenzoate 65%

Ester between 4-allyloxybenzoic acid and 4'-propoxyphenyl 4-hydroxybenzoate 75%

Ester between 4-allyloxybenzoic acid and 2'-naphthyl 4-hydroxybenzoate 76%

(c) 4-Methacryloyloxyphenyl 4-allyloxybenzoate 1 mole of 4-hydroxyphenyl 4-allyloxybenzoate, prepared as described in U.S. Pat. No. 5,211,877, 1.1 mole of methacrylic anhydride and 10 g of p-toluenesulfonic acid are dissolved in 300 ml of toluene and warmed at 100° C. for 1 hour. 100 ml of hexane are added to the cooled solution, and the precipitate is recrystallized from ethanol. Yield: 75% to 80%

(d) 4-R-phenyl-4-allyloxybenzoate 1 mole of 4-substituted phenol and 1 mole of 4-allyloxybenzoyl chloride are dissolved in 300 ml of toluene and refluxed for 8 hours. The reaction solution is cooled to room temperature, and the precipitated product is filtered off with suction. The crude product is recrystallized from ethanol. Yield:

| | |
|---|---|
| Phenyl 4-allyloxybenzoate | 85% |
| 4-Methoxyphenyl 4-allyloxybenzoate | 90% |
| 4-Ethylphenyl 4-allyloxybenzoate | 90% |
| 4-Propoxyphenyl 4-allyloxybenzoate | 80% |

Example 2

Novel liquid crystal having a broad nematic phase and good alignability 14.96 g of pentamethylcyclopentasiloxane, 12.71 g of the ester between 4-allyloxybenzoic acid and phenyl 4-hydroxybenzoate, 13.66 g of the ester between 4-allyloxybenzoic acid and 4'-ethylphenyl 4-hydroxybenzoate, 13.73 g of the ester between 4-allyloxybenzoic acid and 4'-methoxyphenyl 4-hydroxybenzoate and 14.68 g of the ester between 4-allyloxybenzoic acid and 4'-propoxyphenyl 4-hydroxy-benzoate are dissolved in 100 ml of toluene, 0.5 ml of dicyclopenta dienylplatinum dichloride solution (1% strength by weight in methylene chloride) is added, and the mixture is warmed at 100° C. for 1 hour. The solution is cooled to 50° C., 30.64 g of 4-methacryloyloxy-phenyl 4-allyloxybenzoate, 100 ml of toluene and 100 mg of 4-methoxyphenol are added, and the mixture is stirred at 80° C. for 1 hour. The product is filtered through a micropore filter and dried, giving 100 g of a substance having a nematic phase between the glass transition temperature at 22° C. and the clearing point at 168° C.

Example 3

Novel liquid crystal having broad nematic phase and good alignability 1.73 g of tetramethylcyclotetrasiloxane, 2.0 g of the ester between 4-allyloxybenzoic acid and phenyl 4-hydroxybenzoate, 12.15 g of the ester between 4-allyloxybenzoic acid and 4'-ethylphenyl 4-hydroxybenzoate and 2.16 g of the ester between 4-allyloxybenzoic acid and 4'-methoxyphenyl 4-hydroxybenzoate are dissolved in 20 ml of toluene, 0.05 ml of dicyclopentadienylplatinum dichloride solution (1% strength by weight in methylene chloride) is added, and the mixture is warmed at 100° C. for 1 hour. The solution is cooled to 50° C., 3.61 g of 4-methacryloyloxyphenyl 4-allyloxybenzoate, 20 ml of toluene and 10 mg of 4-methoxyphenol are added, and the mixture is stirred at 80° C. for 1 hour. The product is filtered through a micropore filter and dried, giving 11 g of a substance having a nematic phase between the glass transition temperature at 30° C. and the clearing point at 181 ° C.

Example 4

Novel liquid crystal having a broad nematic phase and good alignability 1.82 g of pentamethylcyclopentasiloxane, 1.70 g of the ester between 4-allyloxybenzoic acid and phenyl 4-hydroxybenzoate, 1.83 g of the ester between 4-allyloxybenzoic acid and 4'-methoxyphenyl 4-hydroxybenzoate and 1.84 g of the ester between 4-allyloxybenzoic acid and 4'-methoxyphenyl 4-hydroxybenzoate and 1.96 g of the ester between 4-allyloxybenzoic acid and 4'-propoxyphenyl 4-hydroxybenzoate are dissolved in 20 ml of toluene, 0.05 ml of dicyclopentadienylplatinum dichloride solution (1% strength by weight in methylene chloride) is added, and the mixture is warmed at 100° C. for 1 hour. The solution is cooled to 50° C., 3.44 g of 4-methoxyphenyl 4-allyloxybenzoate and 20 ml of toluene are added, and the mixture is stirred at 80° C. for 1 hour. The product is filtered through a micropore filter and dried, giving 12 g of a substance having a nematic phase between the glass transition temperature at 27° C. and the clearing point at 192° C.

Comparative Example 1

Corresponds to Example 1d from U.S. Pat. No. 5,211,877

A solution of 2.0 g of 4-cyanophenyl 4-(prop-2-en-1-oxy)-benzoate, 5.72 g of 4-(prop-2-en-1-oxy)phenyl 4-trimethylsilyloxybenzoate, 1.43 g of hexamethylcyclohexasiloxane and 2 mg of dicyclopentadienylplatinum dichloride in 20 ml of toluene is refluxed for 30 minutes. After 10 ml of ethanol and 0.2 g of potassium hydroxide have been added, the mixture is refluxed for 20 minutes, cleaving the silyl ether. The solution is then concentrated to ⅓ of its volume, 2.0 g of p-toluene-sulfonic acid and 15.4 g of methacrylic anhydride are added, and the mixture is refluxed for an additional 30 minutes. After cooling, the product is reprecipitated twice from toluene/ethanol, giving a product having anematic phase between the glass transition temperature at 25° C. and the clearing point at 940° C.

Comparative Example 2

Liquid crystal having a small phase width and poor alignability built up from a mixture of mesogenic side groups containing 2 aromatic rings 2.27 g of pentamethylcyclopentasiloxane, 1.20 g of phenyl 4-allyloxybenzoate, 1.33 g of 4'-ethylphenyl 4-allyloxybenzoate, 1.34 g of 4'-methoxyphenyl 4-allyloxybenzoate and 1.47 g of 4'-propoxyphenyl 4-allyloxybenzoate are dissolved in 20 ml of toluene, 0.05 ml of dicyclopentadienylplatinum dichloride solution (1% strength by weight in methylene chloride) is added, and the mixture is warmed at 100° C. for 1 hour. The solution is cooled to 50° C, 6.39 g of 4-methacryloyloxyphenyl 4-allyloxybenzoate, 10 mg of 4-methoxyphenol and 20 ml of toluene are added, and the mixture is stirred at 80° C. for 1 hour. The product is filtered through a micropore filter and dried, giving 13 g of a substance having anematic phase between the glass transition temperature at −6° C. and the clearing point at 33° C.

Comparative Example 3

Liquid crystal having a large phase width, but poor alignability, built up from a homopolymer of mesogenic side groups containing 3 aromatic rings 0.15 g of tetramethylcyclotetrasiloxane and 1.0 g of the ester between 4-allyloxybenzoic acid and 4'-methoxyphenyl 4-hydroxybenzoate are dissolved in 10 ml of toluene, 0.02 ml of dicyclopentadienylplatinum dichloride solution (1% strength by weight in methylene chloride) is added, and the mixture is warmed at 100° C. for 1 hour. The product is filtered through a micropore filter and dried, giving 1.0 g of a substance having anematic phase between the glass transition temperature at 46° C. and the clearing point at 172° C.

TABLE

| Phase width and alignability of the nematic compounds | | | |
|---|---|---|---|
| Material | Tg | Tc | Alignability |
| Example 2 | 22 | 168 | very good |
| Example 3 | 30 | 181 | very good |
| Example 4 | 27 | 192 | very good |
| Comparative Example 1 | 25 | 94 | poor |
| Comparative Example 2 | −6 | 33 | poor |
| Comparative Example 3 | 46 | 172 | poor |

What is claimed is:

1. A nematic liquid crystalline cyclic polyorganosiloxane containing at least three different mesogenic side groups per polyorganosiloxane, where at least two mesogenic side groups per polyorganosiloxane each contain at least three radicals individually selected from the group consisting of aromatic, heteroaromatic and cycloaliphatic radicals, and at least one of the mesogenic side groups contains a methacrylic or acrylic group.

2. A cyclic polyorganosiloxane as claimed in claim 1, having at least three units of the formula

$$[A_o R_p SiO_{2/2}] \qquad (1),$$

in which

A is a mesogenic side group of the formula

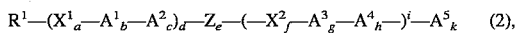

$$R^1—(X^1_a—A^1_b—A^2_c)_d—Z_e—(—X^2_f—A^3_g—A^4_h—)^i—A^5_k \qquad (2),$$

where,

R are identical or different, optionally halogen-substituted $C_1$- to $C_{18}$-hydrocarbon radicals, o and p have the values 0, 1 or 2, and (o+p) is 2, $R^1$ is a radical of the formula $C_n H_m$, in which n is an integer having a value of from 2 to 20, m has the value 2 n, $X^1$ and $X^2$ are identical or different divalent radicals from the group consisting of —O—, —COO—, —CONH—, —CO—, —S—, —C≡C—, —CH=CH—, —CH=N—, —CH$_2$CH$_2$—, —N=N— and —N=N(O)—, $A^1$, $A^{2,}$ $A^3$ and $A^4$ are identical or different divalent radicals from the group consisting of 1,4-phenylene and 1,4-cyclohexylene radicals, substituted arylenes having 1 to 10 carbon atoms, substituted cycloalkylenes having 1 to 10 carbon atoms and heteroarylenes having 1 to 10 carbon atoms, Z are identical or different divalent to tetravalent benzene, cyclohexane or cyclopentane radicals, $A^5$ are identical or different radicals from the group consisting of saturated or olefinically unsaturated alkyl, alkoxy or cycloalkyl radicals, each having 1 to 16 carbon atoms, cholestan radicals, cholesteryl radicals, halogen atoms, hydrogen atoms, hydroxyl, nitrile, acryloxy, (meth)acryloxy, (meth)acryloxyethylenoxy, (meth)acryloxydi(ethylenoxy), (meth)acryloxytri(ethylenoxy) and trialkylsiloxy groups whose alkyl radicals each have 1 to 8 carbon atoms, a,b,c,d,f,g,h and i are each identical or different integers having a value of 0, 1, 2 or 3, where the sum a+b+c+d+e+f+g+h+i+ is at least 2 and the sum of d and i is a maximum of 5, k is a number having a value of 1, 2, 3, 4 or 5, and e is a number having a value of 0 or 1.

3. A process for the preparation of nematic liquid crystalline cyclic polyorganosiloxane as claimed in claim 1 by reacting alkenes or alkynes containing at least three different mesogenic radicals, where at least two of the alkenes or alkynes each contain at least three radicals individually selected from the group consisting of aromatic, heteroaromatic and cycloaliphatic radicals, and at least one of the alkenes or alkynes additionally contains a methacrylic or acrylic group, with cyclic polyorganosiloxames containing at least three hydrogen atoms bonded directly to silicon.

4. A process for the preparation of a cyclic polyorganosiloxane as claimed in claim 2, in which cyclic polyorganosiloxanes having at least three units of the formula $$[H_o R_p SiO_{2/2}] \quad (6)$$

are reacted with alkenes or alkynes containing mesogenic radicals of the formula $$R_4-(X^1{}_a-A^1{}_b-A^2{}_c)_d-Z_e-(-X^2{}_f-A^3{}_g-A^4{}_h-)_i-A^5{}_k \quad (7)$$

where, $R^4$ is a radical of the formula $C_n H_m$, in which m has the value 2n-1 or 2n-3 and o, p, $X^1$, $X^2$, $A^1$, $A^2$, $A^3$, $A^4$, $A^5$, a, b, c, d, e, f, g, h, i, k, Z and R are as defined for formulae (1) and (2) and (o+p) is 2.

5. A polarizer or retarder, comprising, cyclic organopolysiloxanes as claimed in claim 1.

* * * * *